United States Patent
Hall et al.

(10) Patent No.: US 11,421,541 B2
(45) Date of Patent: Aug. 23, 2022

(54) TURBINE NOZZLE WITH COMPLIANT JOINT

(71) Applicant: HONEYWELL INTERNATIONAL INC., Morris Plains, NJ (US)

(72) Inventors: Peter Hall, Prescott, AZ (US); Mark Morris, Phoenix, AZ (US); Manuel Sandoval, Tempe, AZ (US); Robert Burkhead, Tempe, AZ (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 7 days.

(21) Appl. No.: 16/900,692

(22) Filed: Jun. 12, 2020

(65) Prior Publication Data
US 2021/0388728 A1 Dec. 16, 2021

(51) Int. Cl.
*F01D 9/04* (2006.01)
*F01D 11/00* (2006.01)

(52) U.S. Cl.
CPC ............ *F01D 9/041* (2013.01); *F01D 9/042* (2013.01); *F01D 11/005* (2013.01); *F05D 2220/323* (2013.01); *F05D 2240/128* (2013.01); *F05D 2240/55* (2013.01); *F05D 2260/30* (2013.01)

(58) Field of Classification Search
CPC ..... F01D 9/00; F01D 9/02; F01D 9/04; F01D 9/041; F01D 9/042; F01D 11/005; F05D 2240/10; F05D 2240/11; F05D 2240/128; F05D 2240/55; F05D 2260/30
See application file for complete search history.

(56) References Cited

U.S. PATENT DOCUMENTS

| | | |
|---|---|---|
| 5,069,265 A | 12/1991 | Blazek |
| 7,000,406 B2 | 2/2006 | Markarian et al. |
| 8,047,771 B2 | 11/2011 | Tucker et al. |
| 8,166,767 B2 | 5/2012 | Grivas et al. |
| 8,276,649 B2 | 10/2012 | Gagnon, Jr. et al. |
| 8,474,267 B2 | 7/2013 | Nager |
| 8,668,442 B2 | 3/2014 | Morris et al. |
| 9,376,917 B2 | 6/2016 | Murooka et al. |
| 9,611,748 B2 | 4/2017 | Kington et al. |

(Continued)

FOREIGN PATENT DOCUMENTS

| | | |
|---|---|---|
| EP | 3167983 A2 | 5/2017 |
| EP | 3851643 A1 | 7/2021 |

OTHER PUBLICATIONS

Parker Aerospace Gas Turbine Fuel Systems Division, Additive Manufacturing and Engineering Solve Aerospace Challenges, Jun. 6, 2019.

*Primary Examiner* — Woody A Lee, Jr.
*Assistant Examiner* — Elton K Wong
(74) *Attorney, Agent, or Firm* — Lorenz & Kopf, LLP

(57) ABSTRACT

A turbine nozzle for a gas turbine engine includes an outer endwall, and an inner endwall spaced apart from the outer endwall. The turbine nozzle includes at least one airfoil coupled between the inner endwall and the outer endwall, and a compliant joint defined in at least one of the outer endwall and the inner endwall. The compliant joint includes at least one partially-fused seal that is configured to restrict a flow of fluid through the at least one of the outer endwall and the inner endwall and to form a slip-joint above a predetermined threshold stress. The slip-joint is configured to maintain a radial position of the at least one of the outer endwall and the inner endwall.

13 Claims, 10 Drawing Sheets

(56) References Cited

U.S. PATENT DOCUMENTS

| | | | |
|---|---|---|---|
| 9,702,252 B2 | 7/2017 | Kanjiyani et al. | |
| 9,885,245 B2 | 2/2018 | Crosatti et al. | |
| 9,970,307 B2 | 5/2018 | Kanjiyani et al. | |
| 9,988,932 B2 | 6/2018 | Riahi et al. | |
| 10,184,344 B2 | 1/2019 | Roberts et al. | |
| 10,253,643 B2 | 4/2019 | Kerns et al. | |
| 10,378,373 B2 | 8/2019 | Reynolds et al. | |
| 2005/0111969 A1* | 5/2005 | Arness | F01D 9/042 415/189 |
| 2015/0267550 A1 | 9/2015 | Kanjiyani et al. | |
| 2016/0265780 A1 | 9/2016 | Patel et al. | |
| 2016/0348216 A1 | 12/2016 | Szuromi et al. | |
| 2017/0327701 A1* | 11/2017 | Connor | B33Y 10/00 |
| 2018/0368984 A1 | 12/2018 | Kieser et al. | |
| 2020/0063578 A1* | 2/2020 | Notarnicola | F01D 9/04 |
| 2021/0087942 A1* | 3/2021 | Kulinski | F01D 11/04 |

\* cited by examiner

TURBINE NOZZLE WITH COMPLIANT JOINT

TECHNICAL FIELD

The present disclosure generally relates to gas turbine engines, and more particularly relates to a turbine nozzle associated with a turbine of a gas turbine engine having a compliant joint.

BACKGROUND

Gas turbine engines may be employed to power various devices. For example, a gas turbine engine may be employed to power a mobile platform, such as an aircraft. Generally, during the operation of the gas turbine engine it is desirable to minimize leakage paths to maintain gas turbine engine performance. In order to minimize leakage paths in the gas turbine engine, turbine nozzles may be formed as a monolithic or unitary ring. Unitary ring turbine nozzles, however, may be difficult to produce, may have a lower yield and may suffer from thermo-mechanical stresses due to the nature of the unitary ring construction. Thus, in certain instances, it may be desirable to provide a turbine nozzle having a plurality of nozzle segments. Each nozzle segment, however, provides a leakage path through the turbine nozzle. The leakage between nozzle segments may be detrimental to the gas turbine engine. Generally, the leakage increases chargeable cooling flow that does not get turned by the turbine nozzle to produce work across the turbine rotor, which may increase fuel consumption. The increased leakage flow may also waste cooling flow that could be used for combustor and turbine component cooling.

Accordingly, it is desirable to provide a turbine nozzle with a compliant joint that reduces leakage and compensates for thermo-mechanical stresses. Furthermore, other desirable features and characteristics of the present invention will become apparent from the subsequent detailed description and the appended claims, taken in conjunction with the accompanying drawings and the foregoing technical field and background.

SUMMARY

Provided according to various embodiments is a turbine nozzle for a gas turbine engine. The turbine nozzle includes an outer endwall, and an inner endwall spaced apart from the outer endwall. The turbine nozzle includes at least one airfoil coupled between the inner endwall and the outer endwall, and a compliant joint defined in at least one of the outer endwall and the inner endwall. The compliant joint includes at least one partially-fused seal that is configured to restrict a flow of fluid through the at least one of the outer endwall and the inner endwall and to form a slip-joint above a predetermined threshold stress. The slip-joint is configured to maintain a radial position of the at least one of the outer endwall and the inner endwall.

The outer endwall comprises a plurality of outer endwall segments, and the compliant joint is defined between at least one of a pair of adjacent outer endwall segments of the plurality of outer endwall segments. The inner endwall and the outer endwall comprises a plurality of inner endwall segments and a plurality of outer endwall segments, and the compliant joint is defined between at least one of a pair of adjacent inner endwall segments and a pair of adjacent outer endwall segments. The compliant joint includes a protrusion that extends into a channel, and at least one side of the protrusion is at least partially-fused to a wall of the channel to form the partially-fused seal. The at least one side of the protrusion comprises a first side that faces a first wall of the channel, and the at least one partially-fused seal is defined by a first surface that extends from the first side that is at least partially integrally formed with the first wall of the channel. The protrusion further comprises a second side that faces a second wall of the channel, and the at least one partially-fused seal further comprises a second partially-fused seal defined by a second surface that extends from the second side that is at least partially integrally formed with the second wall of the channel. The protrusion further comprises a pair of the first surfaces that each extend from the first side, and the at least one partially-fused seal is defined by the pair of the first surfaces that are each at least partially integrally formed with the first wall of the channel. The protrusion further comprises a pair of the second surfaces that each extend from the second side, and the at least one partially-fused seal is defined by the pair of the second surfaces that are each at least partially integrally formed with the second wall of the channel. Above the predetermined threshold stress, the first surface of the protrusion releases from the first wall of the channel to form the slip-joint. The first surface of the protrusion and the first wall of the channel are at least partially integrally formed along a line of contact.

Further provided is a turbine nozzle for a gas turbine engine. The turbine nozzle includes an outer endwall, and an inner endwall spaced apart from the outer endwall. At least one of the inner endwall and the outer endwall includes a plurality of endwall segments. The turbine nozzle includes at least one airfoil coupled between the inner endwall and the outer endwall. The turbine nozzle includes a compliant joint defined between at least one of a pair of adjacent endwall segments of the plurality of endwall segments. The compliant joint includes a protrusion that is received within a channel, and the protrusion and the channel cooperate to define at least one partially-fused seal that is configured to restrict a flow of fluid through the pair of adjacent endwall segments and to fracture to form a slip-joint above a predetermined threshold stress. The slip-joint is configured to maintain a radial position of the pair of adjacent endwall segments.

The at least one side of the protrusion is at least partially-fused to a wall of the channel to form the partially-fused seal. The at least one side of the protrusion comprises a first side that faces a first wall of the channel, and the at least one partially-fused seal is defined by a first surface that extends from the first side that is at least partially integrally formed with the first wall of the channel. The protrusion further comprises a second side that faces a second wall of the channel, and the at least one partially-fused seal further comprises a second partially-fused seal defined by a second surface that extends from the second side that is at least partially integrally formed with the second wall of the channel. The protrusion further comprises a pair of the first surfaces that each extend from the first side, and the at least one partially-fused seal is defined by the pair of the first surfaces that are each at least partially integrally formed with the first wall of the channel. The protrusion further comprises a pair of the second surfaces that each extend from the second side, and the at least one partially-fused seal is defined by the pair of the second surfaces that are each at least partially integrally formed with the second wall of the channel. Above the predetermined threshold stress, the first surface of the protrusion fractures from the first wall of the channel to form the slip-joint. The first surface of the protrusion and the first wall of the channel are at least partially integrally formed along a line of contact.

Further provided is a turbine nozzle for a gas turbine engine. The turbine nozzle includes an outer endwall, and an inner endwall spaced apart from the outer endwall. At least one of the inner endwall and the outer endwall includes a plurality of endwall segments. The turbine nozzle includes at least one airfoil coupled between the inner endwall and the outer endwall, and a compliant joint defined between at least one of a pair of adjacent endwall segments of the plurality of endwall segments. The compliant joint includes a protrusion that is received within a channel. The protrusion has a first side that faces a first wall of the channel and a second side that faces a second wall of the channel. The first side includes a first surface that extends from the first side that is at least partially integrally formed with the first wall of the channel to define a first partially-fused seal and the second side includes a second surface that extends from the second side that is at least partially integrally formed with the second wall of the channel to define a second partially-fused seal. The first partially-fused seal and the second partially-fused seal are configured to restrict a flow of fluid through the pair of adjacent endwall segments and to fracture to form a slip-joint above a predetermined threshold stress. The slip-joint is configured to maintain a radial position of the pair of adjacent endwall segments.

DESCRIPTION OF THE DRAWINGS

The exemplary embodiments will hereinafter be described in conjunction with the following drawing figures, wherein like numerals denote like elements, and wherein.

DETAILED DESCRIPTION

Figure 1:
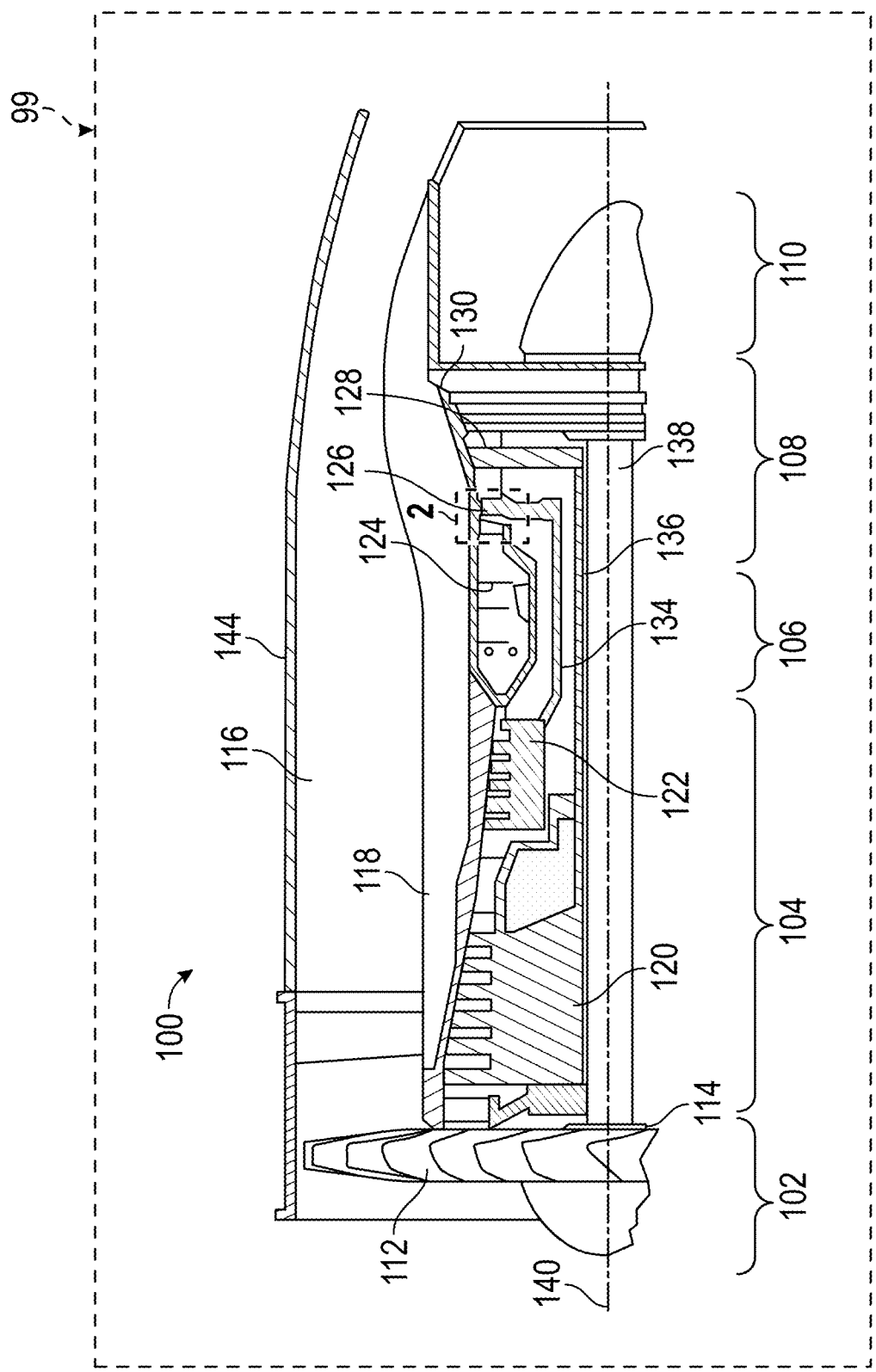
FIG. 1 is a schematic cross-sectional illustration of a gas turbine engine, which includes an exemplary turbine nozzle with at least one compliant joint in accordance with the various teachings of the present disclosure.

The following detailed description is merely exemplary in nature and is not intended to limit the application and uses. Furthermore, there is no intention to be bound by any expressed or implied theory presented in the preceding technical field, background, brief summary or the following detailed description. In addition, those skilled in the art will appreciate that embodiments of the present disclosure may be practiced in conjunction with any type of component for a gas turbine engine that would benefit from a compliant joint with reduced leakage, and that the turbine nozzle for a gas turbine engine is merely one exemplary embodiment according to the present disclosure. Moreover, while the turbine nozzle is described herein as being used with a gas turbine engine onboard a mobile platform, such as a bus, motorcycle, train, motor vehicle, marine vessel, aircraft, rotorcraft and the like, the various teachings of the present disclosure can be used with a gas turbine engine on a stationary platform. Further, it should be noted that many alternative or additional functional relationships or physical connections may be present in an embodiment of the present disclosure. In addition, while the figures shown herein depict an example with certain arrangements of elements, additional intervening elements, devices, features, or components may be present in an actual embodiment. It should also be understood that the drawings are merely illustrative and may not be drawn to scale.

As used herein, the term "axial" refers to a direction that is generally parallel to or coincident with an axis of rotation, axis of symmetry, or centerline of a component or components. For example, in a cylinder or disc with a centerline and generally circular ends or opposing faces, the "axial" direction may refer to the direction that generally extends in parallel to the centerline between the opposite ends or faces. In certain instances, the term "axial" may be utilized with respect to components that are not cylindrical (or otherwise radially symmetric). For example, the "axial" direction for a rectangular housing containing a rotating shaft may be viewed as a direction that is generally parallel to or coincident with the rotational axis of the shaft. Furthermore, the term "radially" as used herein may refer to a direction or a relationship of components with respect to a line extending outward from a shared centerline, axis, or similar reference, for example in a plane of a cylinder or disc that is perpendicular to the centerline or axis. In certain instances, components may be viewed as "radially" aligned even though one or both of the components may not be cylindrical (or otherwise radially symmetric). Furthermore, the terms "axial" and "radial" (and any derivatives) may encompass directional relationships that are other than precisely aligned with (e.g., oblique to) the true axial and radial dimensions, provided the relationship is predominately in the respective nominal axial or radial direction. As used herein, the term "transverse" denotes an axis that crosses another axis at an angle such that the axis and the other axis are neither substantially perpendicular nor substantially parallel.

With reference to FIG. 1, a partial, cross-sectional view of an exemplary gas turbine engine 100 is shown with the remaining portion of the gas turbine engine 100 being axisymmetric about a longitudinal axis 140, which also comprises an axis of rotation for the gas turbine engine 100. In the depicted embodiment, the gas turbine engine 100 is an annular multi-spool turbofan gas turbine jet engine within an aircraft 99, although other arrangements and uses may be provided. As will be discussed herein, with additional brief reference to FIGS. 3-5 and 7, the gas turbine engine 100 includes a turbine nozzle 200, 300 having at least one or a plurality of compliant joints 202, 202'. By providing the turbine nozzle 200, 300 with the compliant joint 202, 202', chargeable leakage through the turbine nozzle 200, 300 is reduced by about 0.7% and non-chargeable leakage through the turbine nozzle 200, 300 is reduced by about 0.6%.

In this example, with reference back to FIG. 1, the gas turbine engine 100 includes a fan section 102, a compressor section 104, a combustor section 106, a turbine section 108, and an exhaust section 110. The fan section 102 includes a fan 112 mounted on a rotor 114 that draws air into the gas turbine engine 100 and accelerates it. A fraction of the accelerated air exhausted from the fan 112 is directed through an outer (or first) bypass duct 116 and the remaining fraction of air exhausted from the fan 112 is directed into the compressor section 104. The outer bypass duct 116 is generally defined by an inner casing 118 and an outer casing 144. In the embodiment of FIG. 1, the compressor section 104 includes an intermediate pressure compressor 120 and a high pressure compressor 122. However, in other embodiments, the number of compressors in the compressor section 104 may vary. In the depicted embodiment, the intermediate pressure compressor 120 and the high pressure compressor 122 sequentially raise the pressure of the air and direct a majority of the high pressure air into the combustor section 106. A fraction of the compressed air bypasses the combustor section 106 and is used to cool, among other components, turbine blades in the turbine section 108.

In the embodiment of FIG. 1, in the combustor section 106, which includes a combustion chamber 124, the high pressure air is mixed with fuel, which is combusted. The high-temperature combustion air is directed into the turbine section 108. In this example, the turbine section 108 includes three turbines disposed in axial flow series, namely, a high pressure turbine 126, an intermediate pressure turbine 128, and a low pressure turbine 130. However, it will be appreciated that the number of turbines, and/or the configurations thereof, may vary. In this embodiment, the high-temperature air from the combustor section 106 expands through and rotates each turbine 126, 128, and 130. As the turbines 126, 128, and 130 rotate, each drives equipment in the gas turbine engine 100 via concentrically disposed shafts or spools. In one example, the high pressure turbine 126 drives the high pressure compressor 122 via a high pressure shaft 134, the intermediate pressure turbine 128 drives the intermediate pressure compressor 120 via an intermediate pressure shaft 136, and the low pressure turbine 130 drives the fan 112 via a low pressure shaft 138.

Figure 2:
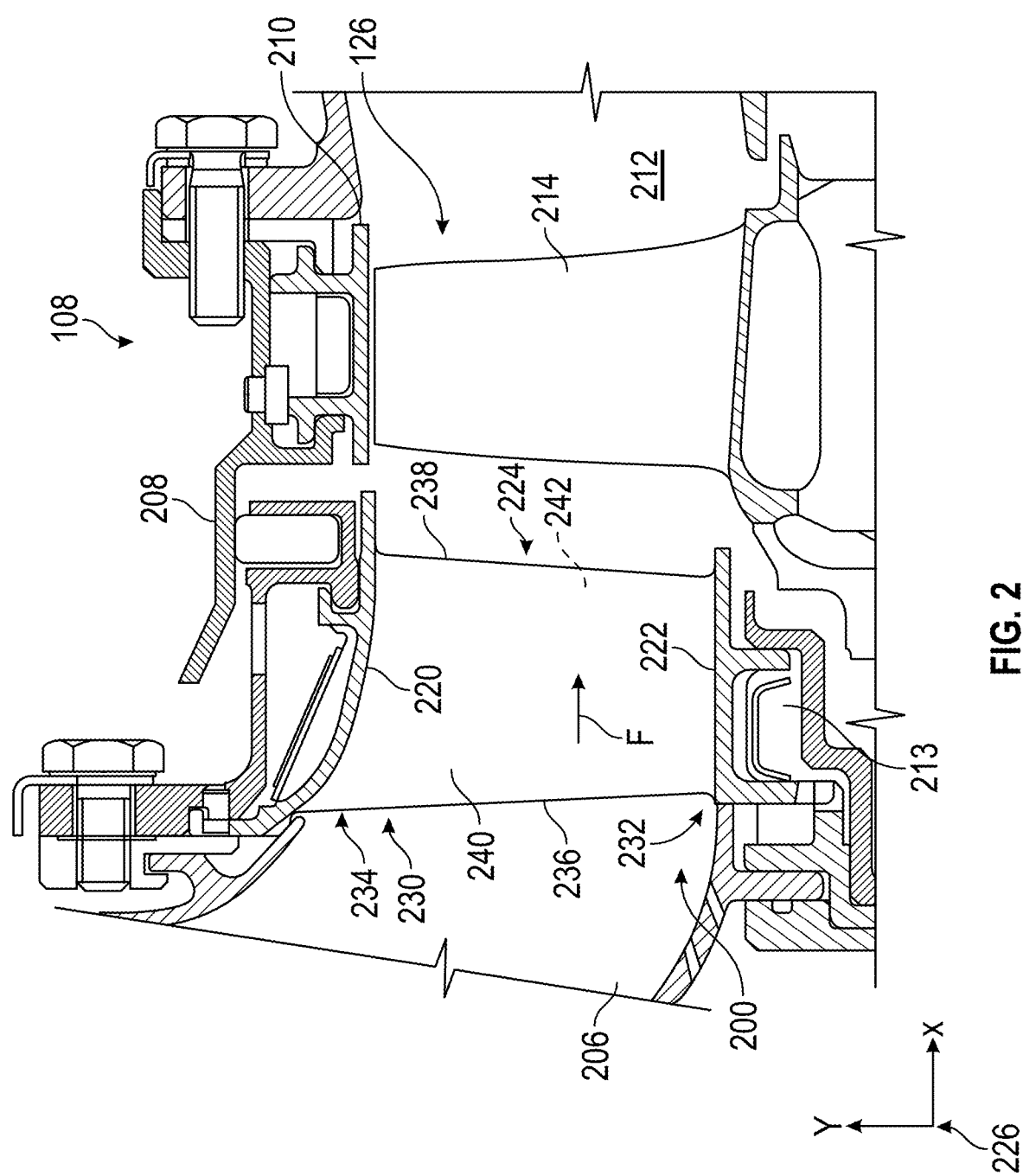
FIG. 2 is a detail cross-sectional view of the gas turbine engine of FIG. 1, taken at 2 of FIG. 1, which illustrates a portion of a turbine section of the gas turbine engine including the turbine nozzle with the at least one compliant joint.

With reference to FIG. 2, a portion of the turbine section 108 of the gas turbine engine 100 of FIG. 1 is shown in greater detail. In the example of FIG. 2, the turbine nozzle 200 is shown, which in this example is positioned at a downstream or outlet end 206 of the combustion chamber 124 (FIG. 1). The turbine nozzle 200 is upstream from the high pressure turbine 126. An engine case 208 surrounds the turbine section 108, and a turbine shroud 210 surrounds the high pressure turbine 126. The turbine nozzle 200 and the high pressure turbine 126 are each generally axisymmetric about the centerline or rotational or longitudinal axis 140 of gas turbine engine 100. A core gas flow path 212 extends through the gas turbine engine 100 and is defined by the combustion chamber 124, the turbine nozzle 200, the high pressure turbine 126, and the turbine shroud 210. During the operation of the gas turbine engine 100, combustive gasses F are discharged from combustion chamber 124 and progress along the flow path 212. In this example, the turbine nozzle 200 is positioned immediately downstream of combustion chamber 124 and upstream of high pressure turbine 126; however, the turbine nozzle 200 may be associated with other turbines within the turbine section 108. The turbine nozzle 200 meters, accelerates, and turns the combustive gas flow from the combustion chamber 124 (FIG. 1) toward blades 214 of the high pressure turbine 126. After exiting the turbine nozzle 200, the combustive gas flow drives rotation of the high pressure turbine 126 and the spools or shafts (FIG. 1).

Generally, the turbine nozzle 200 includes an outer annular endwall 220 and an inner annular endwall 222, which are substantially concentric and radially spaced. The outer and inner annular endwalls 220, 222 bound inner and outer peripheries of a portion of the flow path 212, which extends through the turbine nozzle 200. A cooling fluid cavity 213 is disposed beneath the inner annular endwall 222. The turbine nozzle 200 also includes a number of stationary nozzle vanes 224, one of which can be seen in the cross-section of FIG. 2. The nozzle vanes 224 are arranged in an annular array, which is located between annular endwalls 220, 222. Each nozzle vane 224 extends between annular endwalls 220, 222 in a different radial direction similar to the spokes of a wheel; the radial direction is a direction extending perpendicular to a centerline of the turbine nozzle 200, which corresponds to the Y-axis of coordinate legend 226. The axial direction is a direction perpendicular to the radial direction and parallel to the centerline of the turbine nozzle 200, which corresponds to the X-axis of the coordinate legend 226 and is parallel to the longitudinal axis 140, which also comprises the axis of rotation for the gas turbine engine 100.

Each nozzle vane 224 includes an airfoil 230, an inner end 232, and an outer end 234. The airfoil 230 includes a leading edge 236, a trailing edge 238, a pressure side 240, and a suction side 242 opposite the pressure side 240. The pressure side 240 is generally concave, while the suction side 242 is generally convex. In some embodiments, the nozzle vane 224 may have an internal cooling circuit formed therein, that may extend from an opening in the first end through the nozzle vane 224 and may include various passages that eventually communicate with trailing edge openings or other openings (not shown) that may be formed in the nozzle vane 224.

Figure 3:
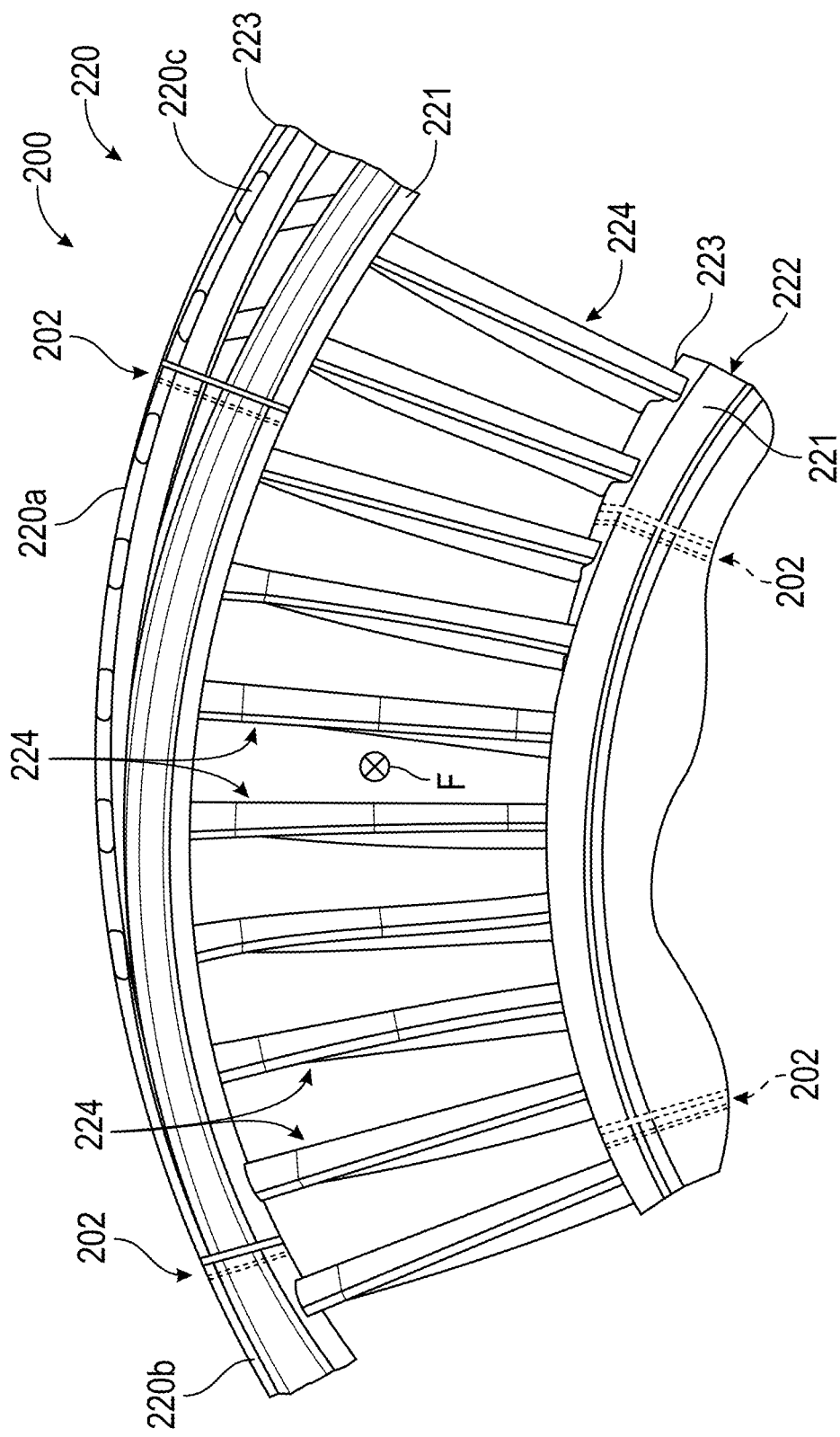
FIG. 3 is a perspective view of a portion of the turbine nozzle of FIG. 2, in which the turbine nozzle is a unitary ring.

With reference to FIG. 3, a portion of the turbine nozzle 200 is shown in greater detail. In the example of FIG. 3, the turbine nozzle 200 is a monolithic or unitary ring, which includes at least one or a plurality of the compliant joints 202. The turbine nozzle 200 is formed of a metal, metal alloy or composite material, such as nickel-base superalloy, cobalt-base superalloy, structural ceramic, silicon nitride, and silicon carbide, and is formed through additive manufacturing, including, but not limited to, direct metal laser sintering (DMLS). It should be noted that other additive manufacturing techniques may be employed, if desired, to form the turbine nozzle 200 as one-piece, integral or monolithic. The compliant joints 202 mitigate thermo-mechanical fatigue and low-cycle fatigue by breaking, releasing or fracturing above a predetermined threshold stress. In one example, the predetermined threshold stress is about 1% to about 50% of the substrate (e.g. turbine nozzle material) shear strength. In this example, the compliant joints 202 are defined in the outer endwall 220, however, it should be understood that alternatively, the compliant joints 202 may be defined in the inner endwall 222. In the example of the compliant joint 202 defined in the outer endwall 220, the outer endwall 220 includes a first outer endwall segment 220a adjacent to a second outer endwall segment 220b and a third outer endwall segment 220c, with a single compliant joint 202 defined or integrally formed between each of the outer endwall segment 220a and 220b; and the outer endwall segment 220a and 220c. It should be noted that while two compliant joints 202 are shown in FIG. 3, the turbine nozzle 200 may have any desired number of compliant joints 202. The outer endwall 220 and the inner endwall 222 each have a leading edge 221 and a trailing edge 223, defined in the direction of the flow of the combustive gasses F through the flow path 212. Alternatively, the inner endwall 222 may include a plurality of inner endwall segments, which each include the compliant joint 202 defined between adjacent ones of the plurality of inner endwall segments, as noted in broken lines on FIG. 3.

Figure 4:
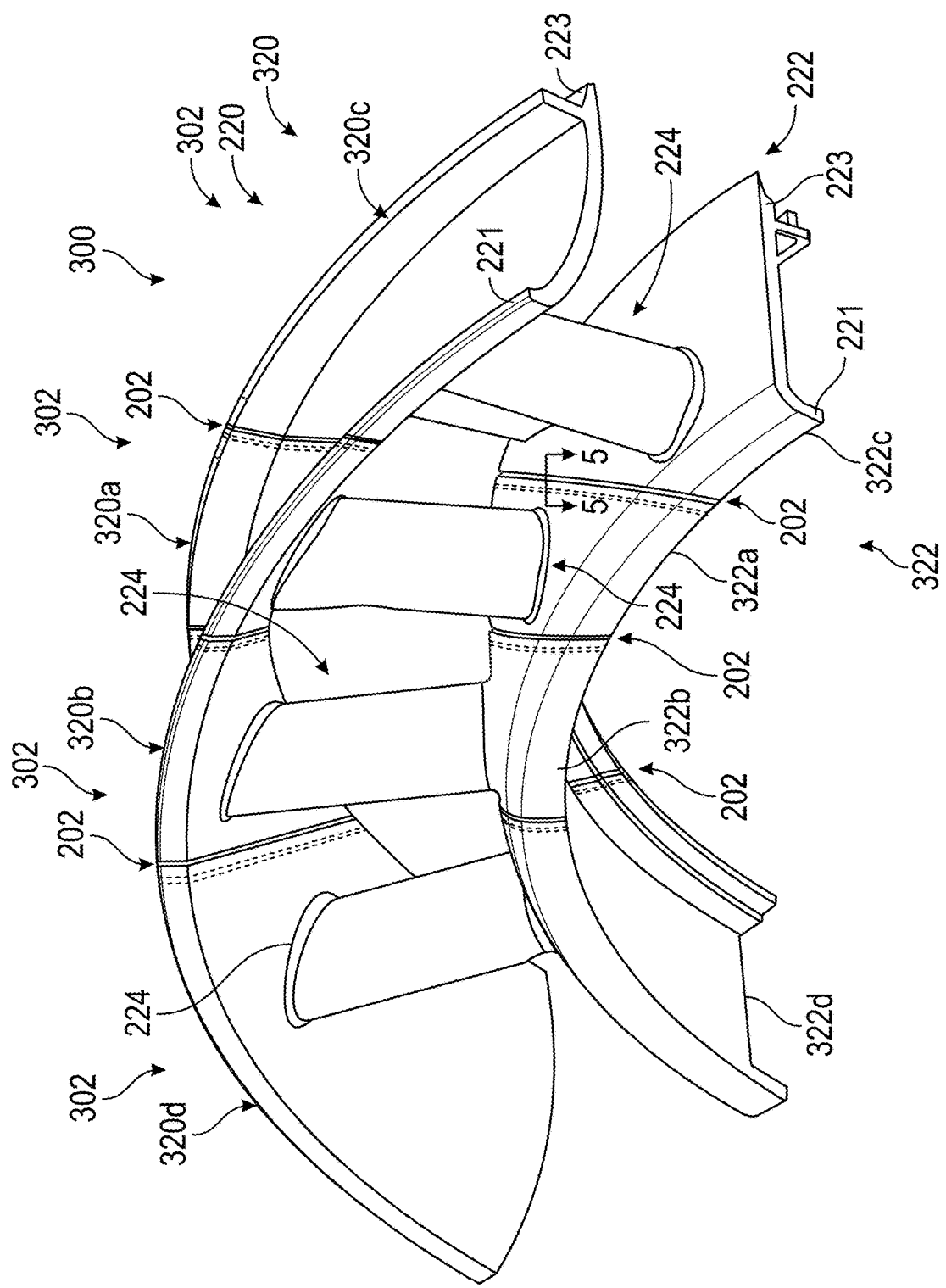
FIG. 4 is a perspective view of a portion of the turbine nozzle of FIG. 2, in which the turbine nozzle includes a plurality of nozzle segments that are assembled together to form a full-ring.

It should be noted, however, that the compliant joints 202 may be employed with turbine nozzles of other configurations. For example, with reference to FIG. 4, a portion of a turbine nozzle 300 is shown in greater detail. In one example, the turbine nozzle 300 is segmented or is not a monolithic or unitary ring, and includes the plurality of nozzle segments 302 that are assembled together to form a full-ring. Each of the nozzle segments 302 include an outer endwall segment 320, an inner endwall segment 322 and one or more of the nozzle vanes 224, which extend radially between the endwall segments 320, 322. The nozzle segments 302 are formed of a metal, metal alloy or composite material, such as nickel-base superalloy, cobalt-base superalloy, structural ceramic, silicon nitride, and silicon carbide, and are formed through additive manufacturing, including, but not limited to, direct metal laser sintering (DMLS). The outer endwall segments 320, when assembled, form an outer annular endwall, and the inner endwall segments 322, when assembled, formed an inner annular endwall. Thus, the annular endwalls, in the example of FIG. 4, comprise segmented annular endwalls that are assembled into a ring. The nozzle segments 302 each have the leading edge 221 and the trailing edge 223, defined in the direction of the flow of the combustive gasses F through the flow path 212. In one example, each of the nozzle segments 302 include a single one of the nozzle vanes 224, which extends between the respective endwall segments 320, 322; however, the nozzle segments 302 may include two nozzle vanes 224 (doublets), three nozzle vanes 224 (triplets), four nozzle vanes 224 (quadruplet), etc. It should be noted that while FIG. 4 depicts the turbine nozzle 300 with a plurality of singlet nozzle segments 302, the turbine nozzle 300 may be manufactured with combinations of singlets, doublets, triplets, quadruplets, etc.

In this example, the turbine nozzle 300 also has at least one or a plurality of the compliant joints 202. The compliant joints 202 are defined between adjacent nozzle segments 302. In one example, the compliant joints 202 are defined at the outer endwall segments 320 and the inner endwall segments 322. In the example of the compliant joint 202 defined in the outer endwall segments 320, the outer endwall segments 320 includes a first outer endwall segment 320a adjacent to a second outer endwall segment 320b and a third outer endwall segment 320c; and the second outer endwall segment 320b is adjacent to a fourth outer endwall segment 320d. A single compliant joint 202 is defined or integrally formed between each of the outer endwall segments 320a and 320b; the outer endwall segments 320a and 320c; and the outer endwall segments 320b and 320d. In the example of the compliant joint 202 defined in the inner endwall segments 322, the inner endwall segments 322 includes a first inner endwall segment 322a adjacent to a second inner endwall segment 322b and a third inner endwall segment 322c; and the second inner endwall segment 322b is adjacent to a fourth inner endwall segment 322d. A single compliant joint 202 is defined or integrally formed between each of the inner endwall segments 322a and 322b; the inner endwall segments 322a and 322c; and the inner endwall segments 322b and 322d. It should be noted, however, that the compliant joints 202 may be defined at one of the outer endwall segments 320 or the inner endwall segments 322, and need not be defined through both endwall segments 320, 322.

Figure 5:
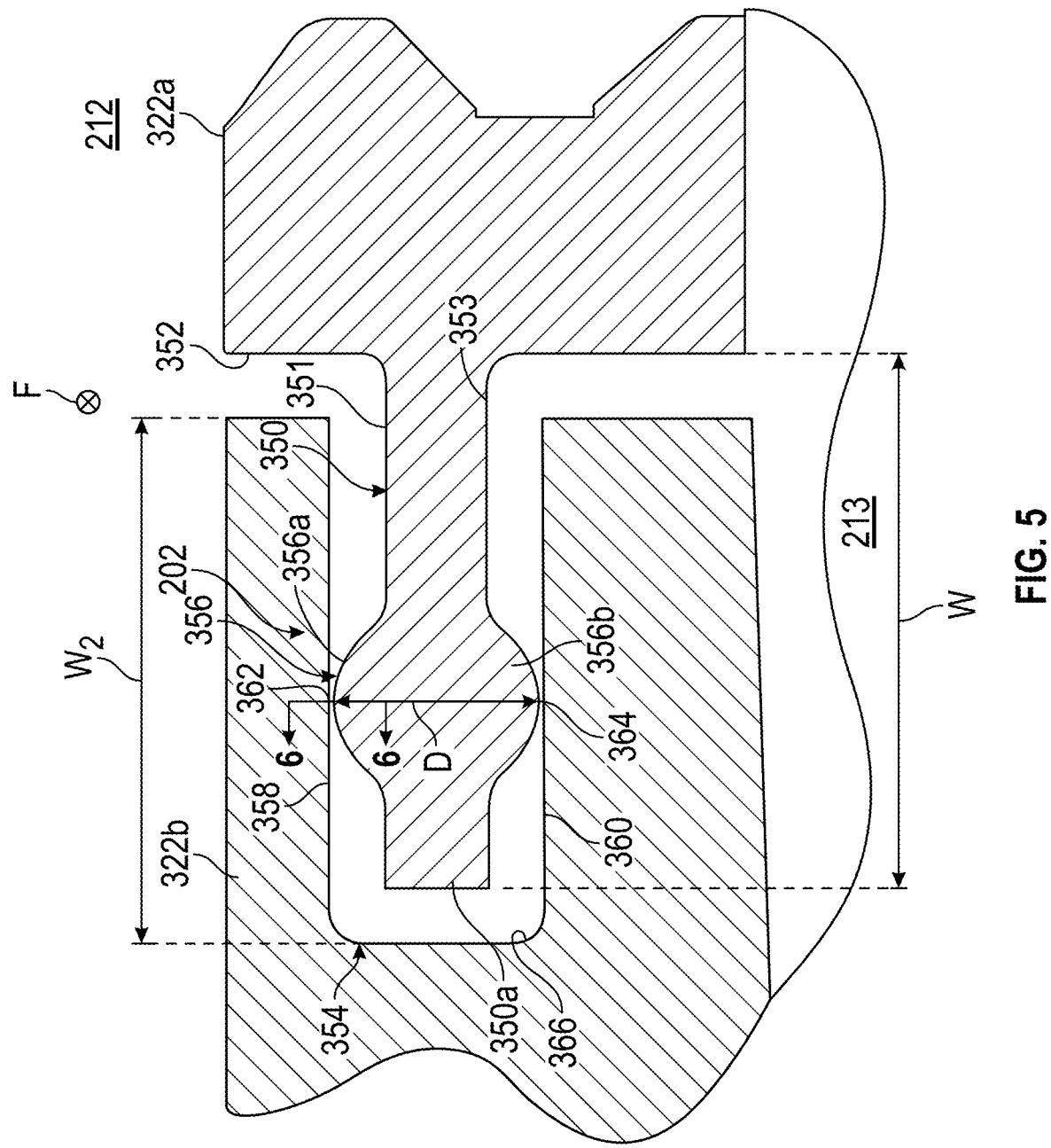
FIG. 5 is a cross-sectional view of the compliant joint associated with the turbine nozzle of FIG. 3 or FIG. 4, taken along line 5-5 of FIG. 4.

With reference to FIG. 5, the compliant joint 202 is shown in greater detail. As discussed, the compliant joint 202 may be employed the outer endwall 220 and/or the inner endwall 222 of the turbine nozzle 200 and may be employed with the outer endwall segment 320 and/or the inner endwall segment 322 of the turbine nozzle 300. In the example of FIG. 5, the compliant joint 202 is shown defined between the inner endwall segments 322a and 322b. It should be understood that the remainder of the compliant joints 202 defined between the inner endwall segments 322a and 322c; the inner endwall segments 322b and 322d; the outer endwall segments 320a and 320b; the outer endwall segments 320a and 320c; the outer endwall segments 320b and 320d; the outer endwall segment 220a and 220b; the outer endwall segment 220a and 220c; and inner endwall segments associated with the inner endwall 222 are the same, and thus, a single one of the compliant joints 202 will be described in detail herein. As shown in FIG. 5, in one example, the compliant joint 202 is defined or at least partially integrally formed within the inner endwall segments 322a, 322b.

In this example, the compliant joint 202 is a partially-fused slip-joint, which fractures, breaks or releases once the thermo-mechanical stresses exceed the predetermined threshold stress while also acting as a seal between the adjacent endwall segments 220, 320, 222, 322. By fracturing, breaking or releasing, the compliant joint 202 eliminates hoop stress, and enables the adjacent endwall segments 220, 320, 222, 322 to move independently of the adjacent one of the adjacent endwall segments 220, 320, 222, 322 axially, while maintaining a radial position of the adjacent endwall segments 220, 320, 222, 322. Further, the shape of the complaint joints 202 acts as a seal and reduces or minimizes leakage of fluid through the adjacent endwall segments 220, 320, 222, 322.

In this example, the inner endwall segment 322a has a monolithic or integrally formed protrusion 350, which extends axially outward from a side 352 of the inner endwall segment 322a. The protrusion 350 extends over a length of the inner endwall segment 322a from the leading edge 221 to the trailing edge 223. In one example, the protrusion 350 has a width W. The width W is sized such that the protrusion 350 extends within and is at least partially joined to a channel 354 defined in the inner endwall segment 322b. The channel 354 extends over a length of the inner endwall segment 322b from the leading edge 221 to the trailing edge 223. The channel 354 has a width W2. The width W2 is substantially the same as the width W, however, in other embodiments, the width W2 may be different than the width W. The widths W, W2 are predetermined to provide thermal growth clearance during the operation of the gas turbine engine 100 (FIG. 1). In this example, the protrusion 350 has a cylinder or bead 356. The bead 356 is rounded, and has a diameter D sized such that the bead 356 is coupled to and at least partially integrally formed with opposed first and second walls 358, 360 of the channel 354. In this example, the bead 356 has a first contact surface 356a opposite a second contact surface 356b. In this example, the first contact surface 356a and the second contact surface 356b are semicircular or rounded, but the first contact surface 356a and the second contact surface 356b may have any desired shape. The bead 356 is sized such that the first contact surface 356a extends beyond a first surface 351 of the protrusion 350, and the second contact surface 356b extends beyond a second surface 353 of the protrusion 350.

The first contact surface 356a and the first wall 358 of the channel 354 are coupled together or at least partially integrally formed together along a first line of contact 362. The second contact surface 356b and the second wall 360 of the channel 354 are coupled together or at least partially integrally formed together along a second line of contact 364. Each of the first line of contact 362 and the second line of contact 364 extends from the leading edge 221 to the trailing edge 223 between the inner endwall segments 322a, 322b. Each line of contact 362, 364 is a line of partial fusion of the bead 356 of the inner endwall segment 322a to the channel 354 of the inner endwall segment 322b. It should be noted that while the first contact surface 356a and the second contact surface 356b and the respective first and second walls 358, 360 are described as having a line of contact or partial fusion, the first contact surface 356a and the second contact surface 356b and the respective first and second walls 358, 360 may have surface to surface partial fusion or contact, if desired.

Figure 6A:
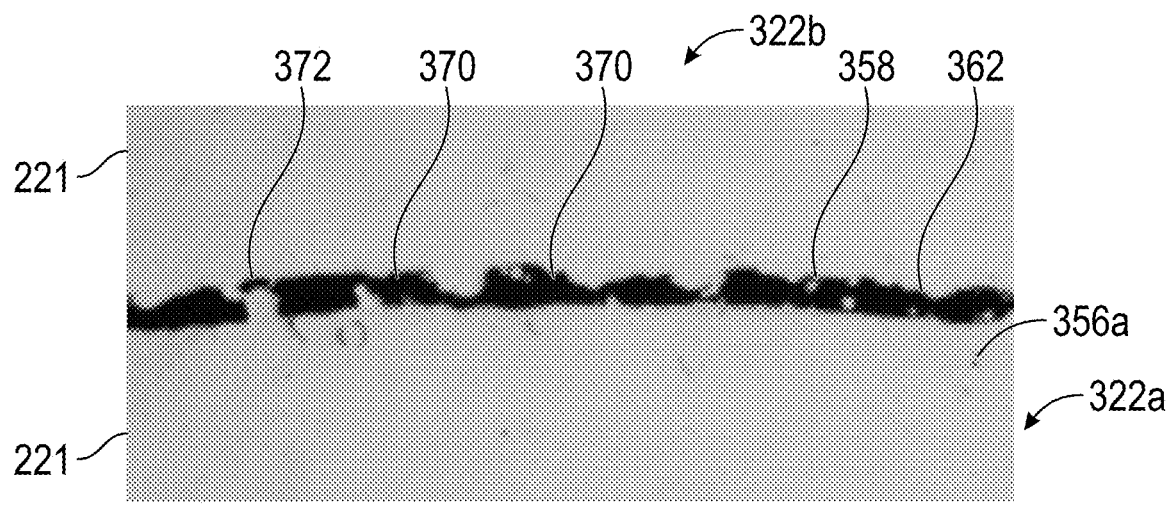
FIG. 6A is a photographic image of a line of contact between adjacent endwall segments at the compliant joint with little fusion, taken from the perspective of line 6-6 of FIG. 5.

With reference to FIG. 6A, the first line of contact 362 between the first contact surface 356a and the first wall 358 of the channel 354 is shown. Generally, the second line of contact 364 is the same as the first line of contact 362, and thus, the first line of contact 362 will be illustrated and described herein. In this example, the line of contact 362 is partially-fused with little fusion and with a nominal gap of about 0.007 inches (in.) and an average gap of about 0.004 inches (in.) between the bead 356 and the channel 354 in the regions that are not fused. Stated another way, during additive manufacturing of the inner endwall segments 322a, 322b, the direct metal laser sintering is not fully completed along the line of contact 362 such that gaps 370 are defined between the first contact surface 356a and the first wall 358. In other regions along the first line of contact 362, fusion 372 occurs between the first contact surface 356a and the first wall 358. This partial fusion, regions of gaps 370 and regions of fusion 372, over the first line of contact 362 enables the first inner endwall segment 322a to release, fracture or break from the second inner endwall segment 322b to form a slip-joint. In the example of FIG. 6A, the predetermined threshold stress required to separate the first inner endwall segment 322a from the second inner endwall segment 322b is about 1.6 kilo pounds per square inch (ksi).

Figure 6B:
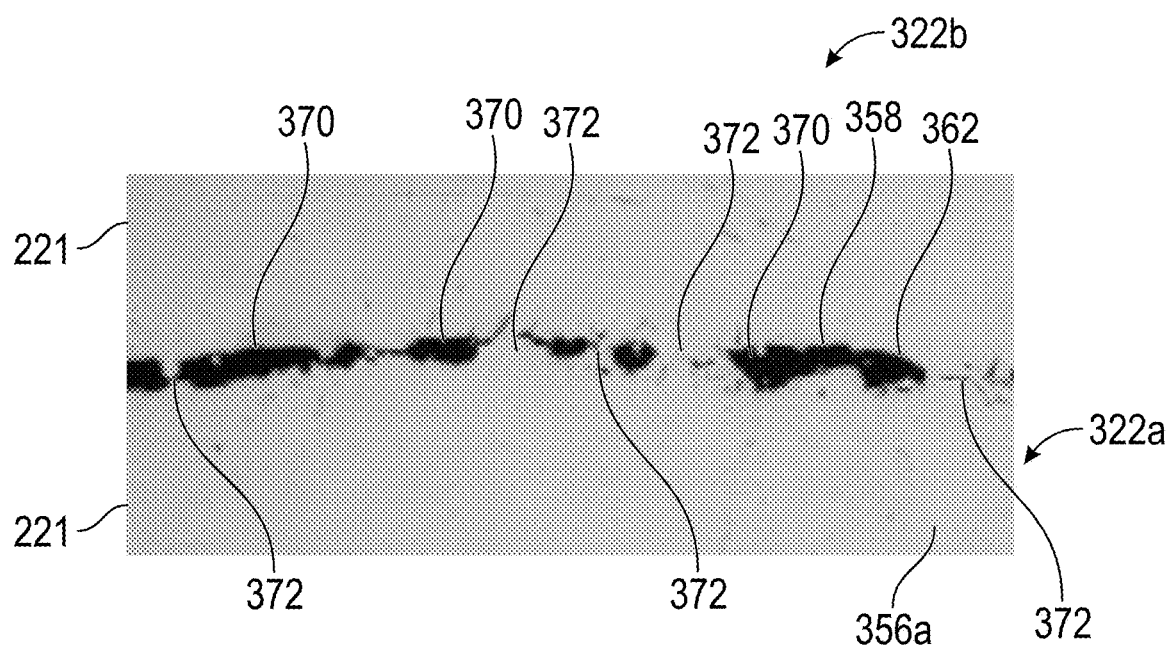
FIG. 6B is a photographic image of a line of contact between adjacent endwall segments at the compliant joint with some fusion, taken from the perspective of line 6-6 of FIG. 5.

With reference to FIG. 6B, in another example, the first line of contact 362 between the first contact surface 356a and the first wall 358 of the channel 354 is shown. Generally, the second line of contact 364 is the same as the first line of contact 362, and thus, the first line of contact 362 will be illustrated and described herein. In this example, the line of contact 362 is partially-fused with some fusion and with a nominal gap of about 0.005 inches (in.) and an average gap of about 0.002 inches (in.) to 0.003 inches (in.) between the bead 356 and the channel 354 in the regions that are not fused. Stated another way, during additive manufacturing of the inner endwall segments 322a, 322b, the direct metal laser sintering is not fully completed along the line of contact 362 such that fewer gaps 370 are defined between the first contact surface 356a and the first wall 358 than the example of FIG. 6A. In other regions along the first line of contact 362, fusion 372 occurs between the first contact surface 356a and the first wall 358. This partial fusion, regions of gaps 370 and regions of fusion 372, over the first line of contact 362 enables the first inner endwall segment 322a to release, fracture or break from the second inner endwall segment 322b to form a slip-joint. In the example of FIG. 6B, the predetermined threshold stress required to separate the first inner endwall segment 322a from the second inner endwall segment 322b is about 5.9 kilo pounds per square inch (ksi). Generally, the little fusion shown in the example of FIG. 6A is about 10% to about 25% fused (with about 90% to 75% unfused) along the lines of contact 362, 364 of the compliant joint 202, while the some fusion shown in the example of FIG. 6B is about greater than 25% to about 50% fused (with about less than 75% to 50% unfused) along the lines of contact 362, 364 of the compliant joint 202.

With reference back to FIG. 5, the bead 356 is coupled to or at least partially integrally formed with the channel 354 along the lines of contact 362, 364 such that an end 350a of the protrusion 350 is spaced a distance apart from a wall 366 of the channel 354. By spacing the end 350a from the wall 366 of the channel 354, once the lines of contact 362, 364 have released, broken or fractured, the inner endwall segments 322a, 322b are movable independently along the width W2 of the channel 354 to accommodate thermal and/or structural growth. When the lines of contact 362, 364 are intact as shown in FIG. 5, the lines of contact 362, 364 create a tortuous fluidic leakage path, which deters and inhibits fluid from the cooling fluid cavity 213 from entering into the flow path 212 and the lines of contact 362, 364 act as partially-fused seals between the cooling fluid cavity 213 and the flow path 212. Once the lines of contact 362, 364 break, fracture or release to form the slip-joint, sealing is maintained between the cooling fluid cavity 213 and the flow path 212 due to the tortuous fluidic leakage path defined by the protrusion 350 and the channel 354.

Figure 7:
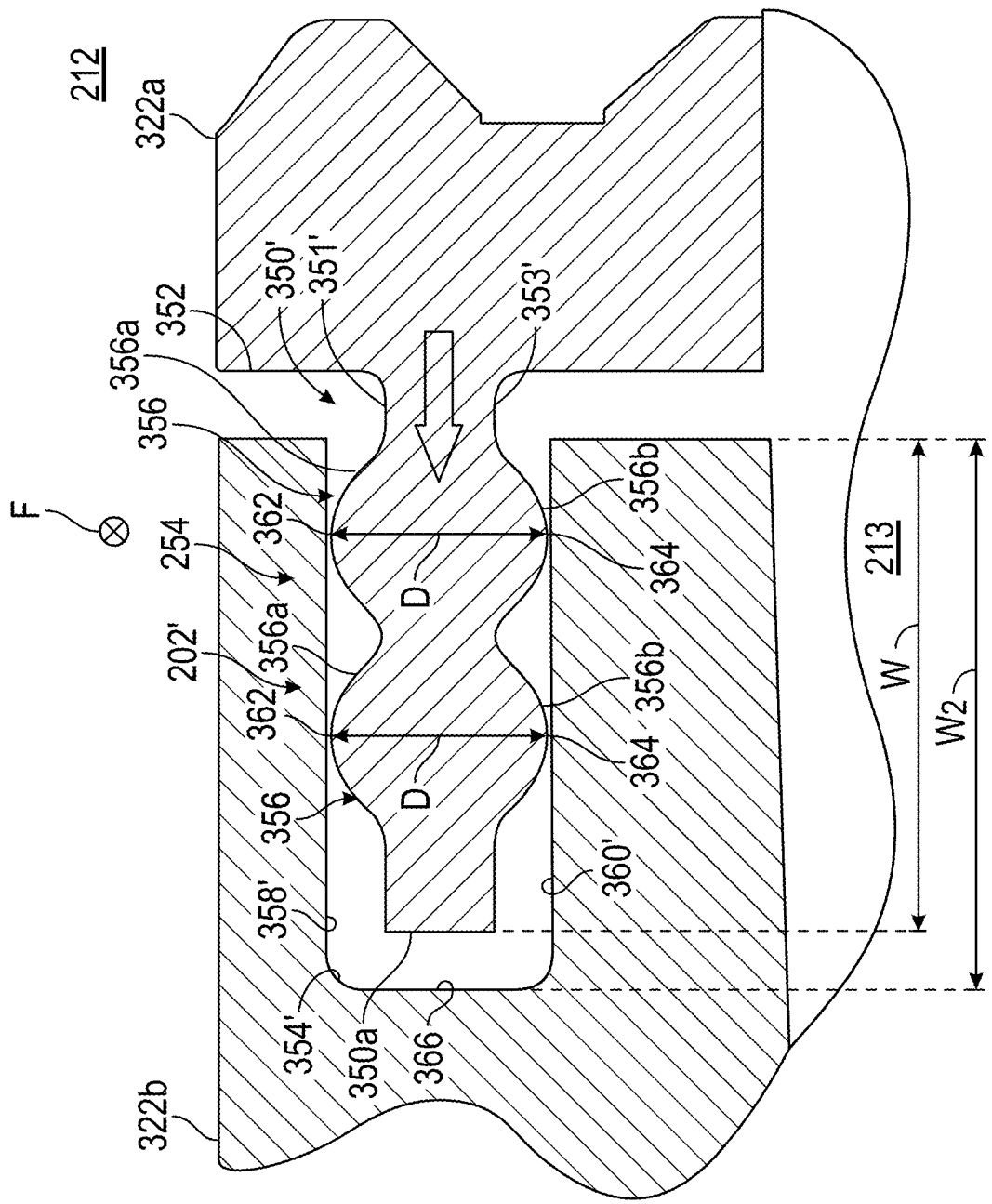
FIG. 7 is a cross-sectional view of another exemplary compliant joint associated with the turbine nozzle of FIG. 3 or FIG. 4, taken from the perspective of line 5-5 of FIG. 4.

It should be noted, however, that the compliant joint 202 may be configured differently to accommodate thermal and/or structural growth while providing a seal that inhibits fluid flow between the cooling fluid cavity 213 and the flow path 212. In one example, with reference to FIG. 7, a compliant joint 202' is shown. The compliant joint 202' may be employed in the outer endwall 220 and/or the inner endwall 222 of the turbine nozzle 200 and may be employed with the outer endwall segment 320 and/or the inner endwall segment 322 of the turbine nozzle 300. In the example of FIG. 7, the compliant joint 202' is shown defined between the inner endwall segments 322a and 322b. It should be understood that the remainder of the compliant joints 202' defined between the inner endwall segments 322a and 322c; the inner endwall segments 322b and 322d; the outer endwall segments 320a and 320b; the outer endwall segments 320a and 320c; the outer endwall segments 320b and 320d; the outer endwall segment 220a and 220b; the outer endwall segment 220a and 220c; and inner endwall segments associated with the inner endwall 222 are the same, and thus, a single one of the compliant joints 202' will be described in detail herein. As shown in FIG. 7, the compliant joint 202' is defined or integrally formed within the inner endwall segments 322a, 322b.

In this example, the compliant joint 202' is a partially-fused slip-joint, which fractures, breaks or releases once the thermo-mechanical stresses exceed the predetermined threshold stress while also acting as a seal between the adjacent endwall segments 220, 320, 222, 322. By fracturing, breaking or releasing, the compliant joint 202' eliminates hoop stress, and enables the adjacent endwall segments 220, 320, 222, 322 to move independently of the adjacent one of the adjacent endwall segments 220, 320, 222, 322 axially, while maintaining a radial position of the adjacent endwall segments 220, 320, 222, 322. Further, the shape of the complaint joints 202 act as a seal, and reduce or minimize leakage of fluid through the adjacent endwall segments 220, 320, 222, 322.

In this example, the inner endwall segment 322a has a monolithic or integrally formed protrusion 350', which extends axially outward from the side 352 of the inner endwall segment 322a. The protrusion 350' extends over a length of the inner endwall segment 322a from the leading edge 221 to the trailing edge 223. In one example, the protrusion 350' has the width W. The width W is sized such that the protrusion 350' extends within and is at least partially joined to a channel 354' defined in the inner endwall segment 322b. The channel 354' extends over a length of the inner endwall segment 322b from the leading edge 221 to the trailing edge 223. The channel 354' has the width W2. The width W2 is substantially the same as the width W, however, in other embodiments, the width W2 may be different than the width W. The widths W, W2 are predetermined to provide thermal growth clearance during the operation of the gas turbine engine 100 (FIG. 1). In this example, the protrusion 350' has two of the cylinder or beads 356. Each of the beads 356 is rounded, and has the diameter D sized such that the beads 356 are each coupled to and at least partially integrally formed with opposed first and second walls 358', 360' of the channel 354'. In this example, each of the beads 356 has the first contact surface 356a opposite the second contact surface 356b. In this example, the first contact surface 356a and the second contact surface 356b are semicircular or rounded, but the first contact surface 356a and the second contact surface 356b may have any desired shape. The bead 356 is sized such that the first contact surfaces 356a extend beyond a first surface 351 of the protrusion 350, and the second contact surfaces 356b extend beyond a second surface 353 of the protrusion 350.

The first contact surface 356a of each of the beads 356 and the first wall 358' of the channel 354' are coupled together or at least partially integrally formed together along respective first lines of contact 362. The second contact surface 356b of each of the beads 356 and the second wall 360' of the channel 354' are coupled together or at least partially integrally formed together along respective second lines of contact 364. Each of the first lines of contact 362 and the second lines of contact 364 extends from the leading edge 221 to the trailing edge 223 between the inner endwall segments 322a, 322b. Each of the lines of contact 362, 364 is a line of partial fusion of the beads 356 of the inner endwall segment 322a to the channel 354' of the inner endwall segment 322b. It should be noted that while the first contact surfaces 356a and the second contact surfaces 356b and the respective first and second walls 358', 360' are described as having a line of contact or partial fusion, the first contact surfaces 356a and the second contact surfaces 356b and the respective first and second walls 358', 360' may have surface to surface partial fusion or contact, if desired. The first lines of contact 362 and the second lines of contact 364 between the respective first and second walls 358', 360' may be partially-fused with little fusion as shown and described with regard to FIG. 6A, or may be partially-fused with some fusion as shown and described with regard to FIG. 6B. Alternatively, one of the first lines of contact 362 and the second lines of contact 364 between the respective first and second walls 358', 360' may be fused with little fusion as shown and described with regard to FIG. 6A, and the other of the first lines of contact 362 and the second lines of contact 364 between the respective first and second walls 358', 360' may be fused with some fusion as shown and described in FIG. 6B. The use of two beads 356 to couple or at least partially integrally form the first inner endwall segment 322a with the second inner endwall segment 322b increases, and doubles in this example, an amount of stress that the compliant joint 202' is capable of enduring before breaking, releasing or fracturing to form the slip-joint, which may be desirable for certain gas turbine engines.

In the example of FIG. 7, the beads 356 are coupled to or at least partially integrally formed with the channel 354' along the lines of contact 362, 364 such that the end 350a of the protrusion 350' is spaced a distance apart from the wall 366 of the channel 354'. By spacing the end 350a from the wall 366 of the channel 354', once the lines of contact 362, 364 have released, broken or fractured, the inner endwall segments 322a, 322b are movable independently along the width W2 of the channel 354' to accommodate thermal growth. When the lines of contact 362, 364 are intact as shown in FIG. 7, the lines of contact 362, 364 create a tortuous fluidic leakage path, which deters and inhibits fluid from the cooling fluid cavity 213 from entering into the flow path 212 and the lines of contact 362, 364 act as partially-fused seals between the cooling fluid cavity 213 and the flow path 212. Once the lines of contact 362, 364 break, fracture or release to form the slip-joint, sealing is maintained between the cooling fluid cavity 213 and the flow path 212 due to the tortuous fluidic leakage path defined by the protrusion 350' and the channel 354'.

Figure 8:
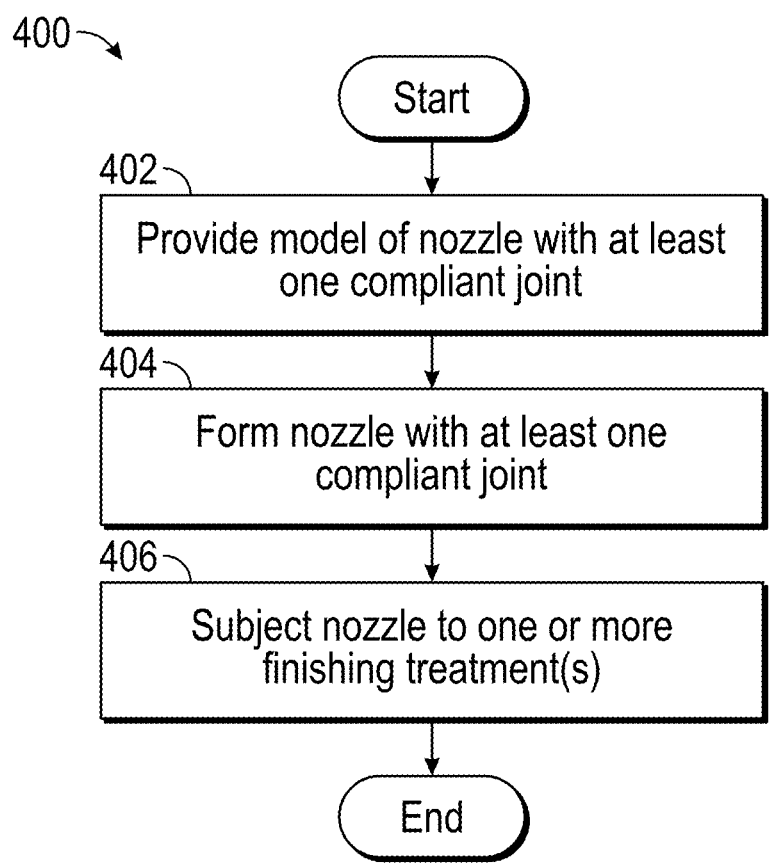
FIG. 8 is a flowchart illustrating a method of forming the turbine nozzle of FIG. 2 or FIG. 3 in accordance with various embodiments.

In one example, as discussed, additive manufacturing processes are used to form net or near-net shaped components, namely the turbine nozzles 200, 300. As such, in one example, FIG. 8 provides a flowchart illustrating a method 400 for manufacturing a nozzle, such as the turbine nozzle 200, 300, using, in whole or in part, powder bed additive manufacturing techniques based on various high energy density energy beams. At 402, a model, such as a design model, of the turbine nozzle 200, 300 that includes at least one of the compliant joints 202, 202' may be defined in any suitable manner. For example, the model may be designed with computer aided design (CAD) software and may include three-dimensional ("3D") numeric coordinates of the entire configuration of the component including both external and internal surfaces. In one exemplary embodiment, the model may include a number of successive two-dimensional ("2D") cross-sectional slices that together form the 3D component. The model may conform with FIGS. 3-6B or FIGS. 3, 4 and 6A-7, as described above.

At 404, the turbine nozzle 200, 300 is formed that includes at least one of the compliant joints 202, 202' according to the model provided at 402. In one example, the entire turbine nozzle 200, 300 is formed using a rapid prototyping or additive layer manufacturing process. Some examples of additive layer manufacturing processes include: direct metal laser sintering (DMLS), in which a laser is used to sinter a powder media in precisely controlled locations;

laser wire deposition in which a wire feedstock is melted by a laser and then deposited and solidified in precise locations to build the product; electron beam melting; laser engineered net shaping; and selective laser melting. In general, powder bed additive manufacturing techniques provide flexibility in free-form fabrication without geometric constraints, fast material processing time, and innovative joining techniques. In one particular exemplary embodiment, DMLS is used to produce the turbine nozzle 200, 300 at 404. DMLS is a commercially available laser-based rapid prototyping and tooling process by which complex parts may be directly produced by precision sintering and solidification of metal powder into successive layers of larger structures, each layer corresponding to a cross-sectional layer of the 3D component. For ceramic nozzles, ceramic stereolithography may be employed to create the turbine nozzle 200 and compliant joints 202, 202'.

Figure 9:
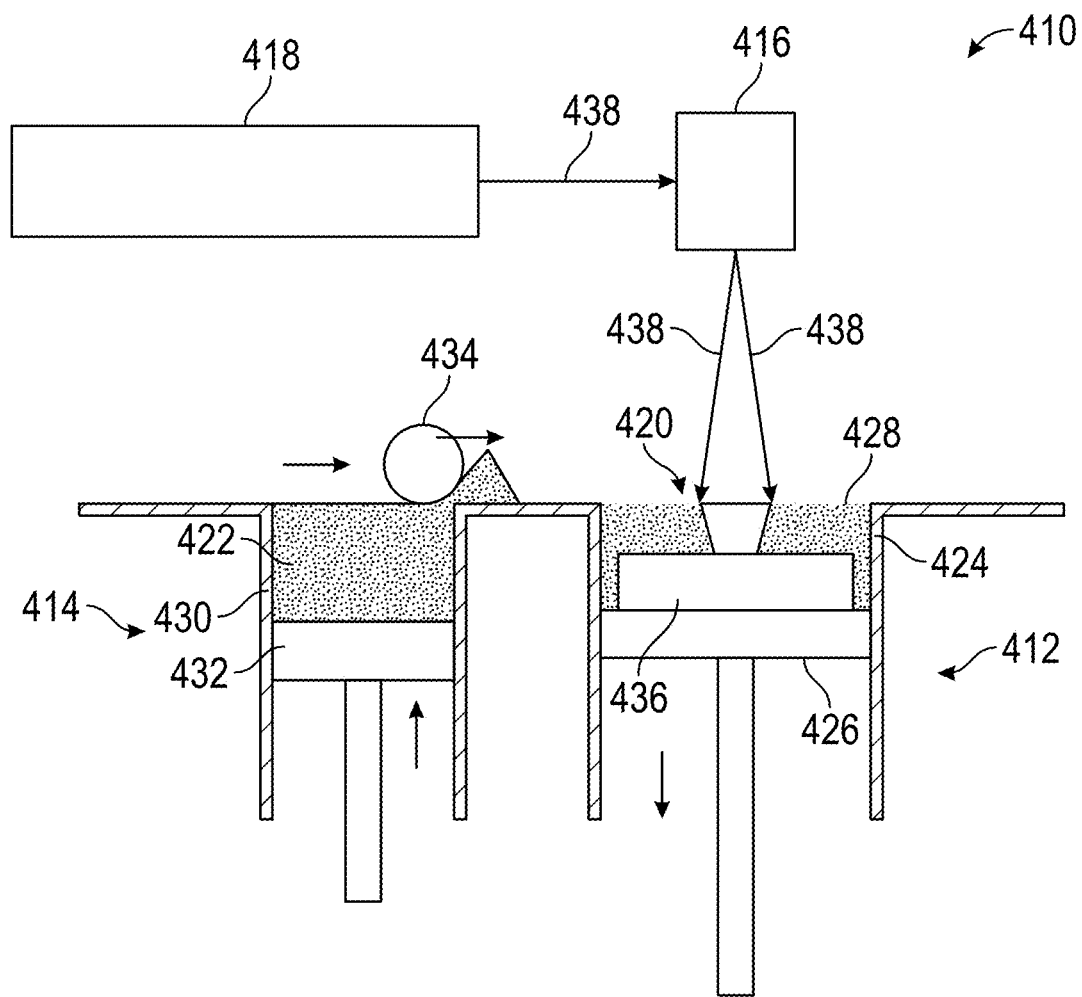
FIG. 9 is a schematic view of an additive manufacturing system for manufacturing the turbine nozzle of FIG. 3 or FIG. 4 in accordance with the method of FIG. 8.

In this regard, with brief reference to FIG. 9, a schematic view of an additive manufacturing system 410 for manufacturing the turbine nozzle 200, 300 that includes at least one of the compliant joints 202, 202' is shown. The additive manufacturing system 410 includes a fabrication device 412, a powder delivery device 414, a scanner 416, and a low energy density energy beam generator, such as a laser 418 (or an electron beam generator in other embodiments) that function to manufacture the article 420 (e.g., the turbine nozzle 200, 300-in-process) with build material 422. The fabrication device 412 includes a build container 424 with a fabrication support 426 on which the article 420 is formed and supported. The fabrication support 426 is movable within the build container 424 in a vertical direction and is adjusted in such a way to define a working plane 428. The powder delivery device 414 includes a powder chamber 430 with a delivery support 432 that supports the build material 422 and is also movable in the vertical direction. The powder delivery device 414 further includes a roller or wiper 434 that transfers build material 422 from the powder delivery device 414 to the fabrication device 412.

During operation, a base block 436 may be installed on the fabrication support 426. The fabrication support 426 is lowered and the delivery support 432 is raised. The roller or wiper 434 scrapes or otherwise pushes a portion of the build material 422 from the powder delivery device 414 to form the working plane 428 in the fabrication device 412. The laser 418 emits a laser beam 438, which is directed by the scanner 416 onto the build material 422 in the working plane 428 to selectively fuse the build material 422 into a cross-sectional layer of the article 420 according to the design. Generally, the speed, position, and other operating parameters of the laser beam 438 are controlled to selectively fuse the powder of the build material 422 into larger structures by rapidly melting the powder particles that may melt or diffuse into the solid structure below, and subsequently, cool and re-solidify. As such, based on the control of the laser beam 438, each layer of build material 422 may include un-fused and fused build material 422 that respectively corresponds to the cross-sectional passages and walls that form the article 420. In general, the laser beam 438 is relatively low power, but with a high energy density, to selectively fuse the individual layer of build material 422. As an example, the laser beam 438 may have a power of approximately 50 to 500 Watts (W), although any suitable power may be provided.

Figure 10:
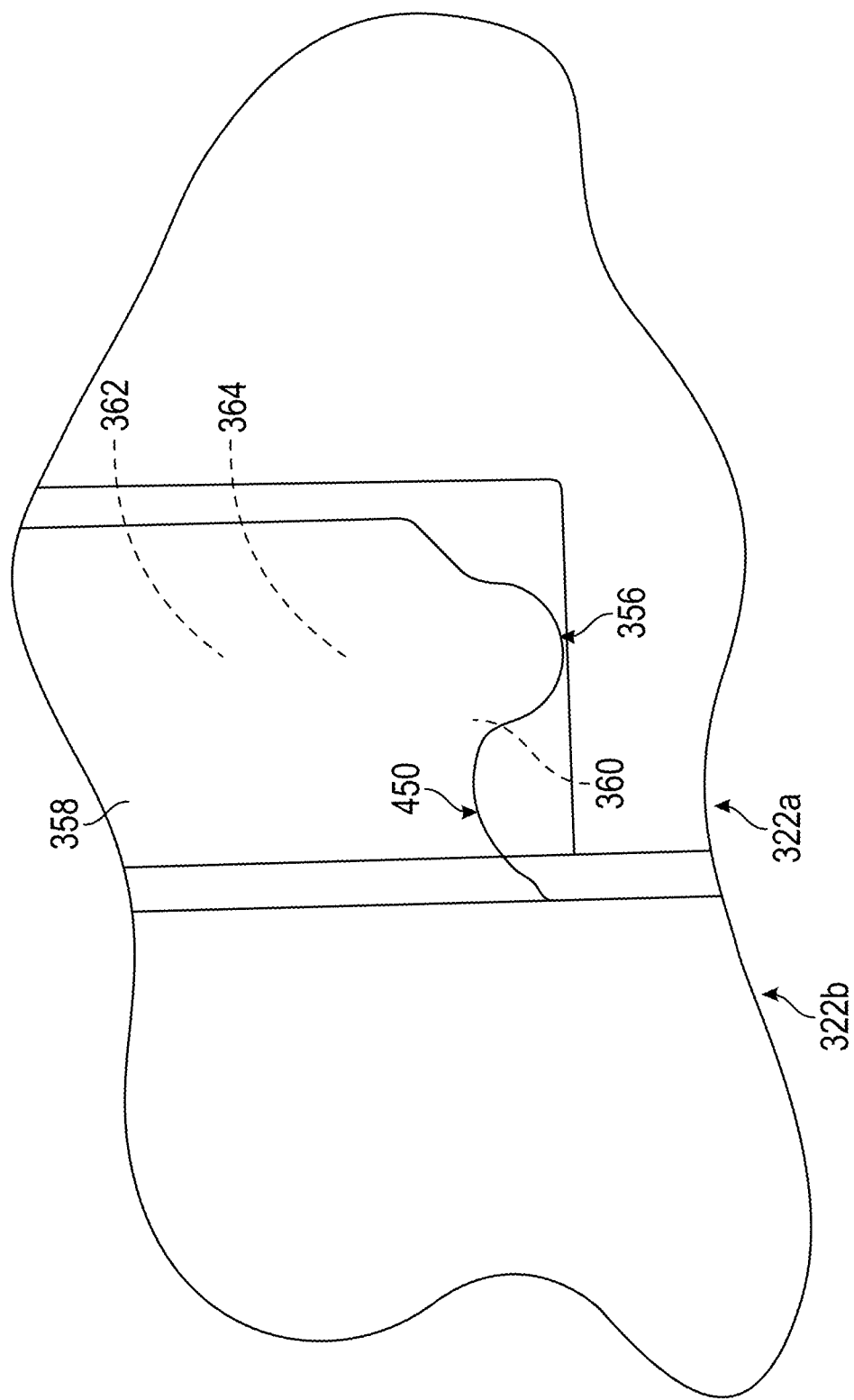
FIG. 10 is a top view of the compliant joint associated with the turbine nozzle of FIG. 3 or FIG. 4 during formation using the additive manufacturing system of FIG. 9, which is rotated 90 degrees to illustrate a building of the compliant joint.

Upon completion of a respective layer, the fabrication support 426 is lowered and the delivery support 432 is raised. Typically, the fabrication support 426, and thus the article 420, does not move in a horizontal plane during this step. The roller or wiper 434 again pushes a portion of the build material 422 from the powder delivery device 414 to form an additional layer of build material 422 on the working plane 428 of the fabrication device 412. The laser beam 438 is movably supported relative to the article 420 and is again controlled to selectively form another cross-sectional layer. As such, the article 420 is positioned in a bed of build material 422 as the successive layers are formed such that the un-fused and fused material supports subsequent layers. This process is continued according to the modeled design as successive cross-sectional layers are formed into the completed desired portion, e.g., the turbine nozzle 200, 300 that includes at least one of the compliant joints 202, 202' at 404. It may also be noted that, in one example, with reference to FIG. 10, in performing the building or forming at 404, the bead 356 may include an overhang region 450 that does not include support from the adjacent endwall segment, in this example, the first inner endwall segment 322a, based on the capability of the build material 422. As shown in FIG. 10, the lines of contact 362, 364 function as build supports during the building of the second inner endwall segment 322b. In this regard, generally, the turbine nozzle 200, 300 is formed by building the first inner endwall segment 322a and moving to forming the second inner endwall segment 322b using the line of contact 364 to build the bead 356 and the channel 354, 354'. In addition, the build direction may be at an angle or orientation, which may minimize the need for supports during building and may minimize the amount of down-skin in critical regions. The nozzle design and build direction is selected to enable fabrication of various features of the turbine nozzle 200, 300 to be built layer by layer, with successive layers supported during the DMLS process by preceding layers below. Those skilled in the art may utilize additive-manufacturing principles to obtain a robust turbine nozzle build, which includes partial fusion in the weak compliant joints 202, 202'. Laser parameters such as laser power, scan speed, and scan geometry are predetermined to produce minimal fusion along the lines of contact 362, 364.

Returning to FIG. 8, at the completion of 404, the article 420 (e.g., turbine nozzle 200, 300-in-process), is removed from the powder bed additive manufacturing system (e.g., from the additive manufacturing system 410) and may be given a stress relief treatment. At 406, the turbine nozzle 200, 300 that includes at least one of the compliant joints 202, 202' formed at 404 may undergo finishing treatments. Such treatments include annealing and/or hot isostatic pressing (HIP), for example. For ceramic nozzles, such treatments may include sintering and shrinkage thermal processing. Additionally, encapsulation of the component may be performed in some embodiments at 406. Such encapsulation layers may be subsequently removed or maintained to function as an oxidation protection layer. Other finishing treatments that may be performed as a part of 406 include aging, quenching, peening, polishing, or applying coatings. Further, if necessary, machining may be performed on the component to achieve a desired final shape.

With the turbine nozzle 200, 300 formed, the turbine nozzle 200, 300 is installed into the gas turbine engine 100 (FIG. 1). In use, as the gas turbine engine 100 operates, the combustive gases F flow from the combustion chamber 124 (FIG. 1) through the flow path 212. The complaint joint 202, 202' acts as a seal, which inhibits flow from the cooling fluid cavity 213 (FIGS. 5 and 7) from entering into the flow path 212. As the turbine nozzle 200, 300 undergoes thermal expansion, mechanical loading and/or aerodynamic loading, once the complaint joint 202, 202' reaches or exceeds the predetermined threshold stress, the bead(s) 356 break, release or fracture along the lines of contact 362, 364, thereby releasing the protrusion 350, 350' from the channel 354, 354' to form the slip-joint. The release of the protrusion 350, 350' from the channel 354, 354' enables axial relative movement between the adjacent endwall segments 220, 320, 322, which reduces hoop stress and compensates for thermal expansion and mechanical deformation while maintaining radial compliance. As the tortuous fluidic leakage path is still defined between the protrusion 350, 350' and the channel 354, 354', the fluid from the cooling fluid cavity 213 remains substantially inhibited from flowing into the flow path 212. Thus, the compliant joint 202, 202' includes the lines of contact 362, 364 that are partially-fused seals, which restrict the flow of fluid from the cooling fluid cavity 213 through the adjacent endwall segments 220, 320, 322. The complaint joint 202, 202' also forms a slip-joint above the predetermined threshold stress, in which the protrusion 350, 350' is fractured, released or broken from the channel 354, 354', which maintains a radial position of the adjacent endwall segments 220, 320, 322.

While the lines of contact 362, 364 are defined herein as partially-fused seals with gaps defined between the bead 356 and the first wall 358, 358' of the channel 354, 354', it should be noted that generally, for thermo-mechanical fatigue life, the predetermined threshold stress of the complaint joint 202, 202' is less than about 50% of the substrate shear strength and is generally between about 1% to about 50% of the substrate shear strength. As used herein, the substrate shear strength is the shear strength of the material from which the respective turbine nozzle 200, 300 is composed. Note that the fused surface area along the lines of contact 362, 364 is small, and thus, the lines of contact 362, 364 generally break with the partial fusion discussed herein. Typically, the complaint joint 202, 202' is defined such that stresses do not build up in the respective endwall segment 220, 320, 222, 322, and fatigue initiation sites do not exist within the respective endwall segment 220, 320, 222, 322. For a particular compliant joint 202, 202', the predetermined threshold stress is based on the predetermined dimensions of the compliant joint 202, 202' and is between about 1% to about 50% of the substrate shear strength.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A turbine nozzle for a gas turbine engine, comprising:
    an outer endwall;
    an inner endwall spaced apart from the outer endwall;
    at least one airfoil coupled between the inner endwall and the outer endwall, with at least one of the inner endwall and the outer endwall including a plurality of endwall segments; and
    a compliant joint defined between at least one pair of adjacent endwall segments of the plurality of endwall segments, the compliant joint including a protrusion that is received within a channel, the protrusion including at least one bead spaced apart from an end of the protrusion, the at least one bead of the protrusion further comprises a first side that faces a first wall of the channel, the first side has a first surface, and a second side that faces a second wall of the channel, the second side has a second surface, at least one first partially-fused seal is defined by the first surface that is at least partially integrally formed with the first wall of the channel, and at least one second partially-fused seal is defined by the second surface that is at least partially integrally formed with the second wall of the channel, the at least one first partially-fused seal and the at least one second partially fused seal are configured to restrict a flow of fluid through the at least one of the outer endwall and the inner endwall and to fracture to form a slip-joint above a predetermined threshold stress, the slip-joint configured to maintain a radial position of the at least one of the outer endwall and the inner endwall, and the end of the protrusion is spaced a distance apart from an end of the channel to enable relative movement between the at least one pair of adjacent endwall segments above the predetermined threshold stress.

2. The turbine nozzle of claim 1, wherein the outer endwall comprises the plurality of endwall segments.

3. The turbine nozzle of claim 1, wherein the inner endwall and the outer endwall each comprise the plurality of endwall segments.

4. The turbine nozzle of claim 1, wherein the protrusion further comprises a pair of the beads, each of the pair of the beads having the first surface, and the at least one first partially-fused seal is a pair of first partially-fused seals defined by a respective one of the first surfaces of the pair of beads that are each at least partially integrally formed with the first wall of the channel.

5. The turbine nozzle of claim 4, wherein each of the pair of the beads of the protrusion includes the second surface, and the at least one second partially-fused seal includes a pair of second partially-fused seals defined by a respective one of the second surfaces of the pair of beads that are each at least partially integrally formed with the second wall of the channel.

6. The turbine nozzle of claim 1, wherein above the predetermined threshold stress, the first surface of the at least one bead of the protrusion releases from the first wall of the channel to form the slip-joint.

7. The turbine nozzle of claim 1, wherein the first surface of the at least one bead of the protrusion and the first wall of the channel are at least partially integrally formed along a line of contact such that the at least one first partially-fused seal is greater than 25% up to 50% fused along the line of contact.

8. A turbine nozzle for a gas turbine engine, comprising:
an outer endwall;
an inner endwall spaced apart from the outer endwall, with at least one of the inner endwall and the outer endwall including a plurality of endwall segments;
at least one airfoil coupled between the inner endwall and the outer endwall; and
a compliant joint defined between at least one of a pair of adjacent endwall segments of the plurality of endwall segments, the compliant joint including a protrusion that is received within a channel, the protrusion includes at least one bead that comprises a first side that faces a first wall of the channel, a second side that faces a second wall of the channel, the first side has a first surface, the second side has a second surface, at least one partially-fused seal is defined by the first surface that is at least partially integrally formed with the first wall of the channel, at least one second partially-fused seal is defined by the second surface that is at least partially integrally formed with the second wall of the channel, the at least one partially-fused seal and the at least one second partially-fused seal are configured to restrict a flow of fluid through the pair of adjacent endwall segments and to fracture to form a slip-joint above a predetermined threshold stress, the slip-joint configured to maintain a radial position of the pair of adjacent endwall segments.

9. The turbine nozzle of claim 8, wherein the protrusion further comprises a pair of beads, each of the pair of beads includes the first surface, and the at least one partially-fused seal is a pair of partially-fused seals defined by a respective one of the first surfaces of the pair of beads that are each at least partially integrally formed with the first wall of the channel.

10. The turbine nozzle of claim 9, wherein the pair of beads of the protrusion each includes the second surface, and the at least one second partially-fused seal includes a pair of second partially-fused seals defined by a respective one of the second surfaces of the pair of beads that are each at least partially integrally formed with the second wall of the channel.

11. The turbine nozzle of claim 8, wherein above the predetermined threshold stress, the first surface of the protrusion fractures from the first wall of the channel to form the slip-joint.

12. The turbine nozzle of claim 8, wherein the first surface of the protrusion and the first wall of the channel are at least partially integrally formed along a line of contact.

13. A turbine nozzle for a gas turbine engine, comprising:
an outer endwall;
an inner endwall spaced apart from the outer endwall, with at least one of the inner endwall and the outer endwall including a plurality of endwall segments, each of the plurality of endwall segments having a leading edge and a trailing edge;
at least one airfoil coupled between the inner endwall and the outer endwall; and
a compliant joint defined between at least one of a pair of adjacent endwall segments of the plurality of endwall segments, the compliant joint including a protrusion that is received within a channel, the protrusion includes a bead that has a first side that faces a first wall of the channel and a second side that faces a second wall of the channel, the bead defined on the protrusion so as to be spaced apart from an end of the protrusion, the first side including a first surface that is at least partially integrally formed with the first wall of the channel from the leading edge to the trailing edge to define a first partially-fused seal, the second side including a second surface that is at least partially integrally formed with the second wall of the channel from the leading edge to the trailing edge to define a second partially-fused seal, the first partially-fused seal and the second partially-fused seal are configured to restrict a flow of fluid through the pair of adjacent endwall segments and to fracture to form a slip-joint above a predetermined threshold stress, the slip-joint configured to maintain a radial position of the pair of adjacent endwall segments and the end of the protrusion is spaced a distance apart from an end of the channel to enable relative movement between the at least one pair of adjacent endwall segments above the predetermined threshold stress.

* * * * *